(12) United States Patent
Muraji

(10) Patent No.: US 6,476,701 B1
(45) Date of Patent: Nov. 5, 2002

(54) ACTUATOR

(75) Inventor: Tetsuo Muraji, Odawara (JP)

(73) Assignee: Mikuni Corporation, Tokyo (JP)

(*) Notice: Subject to any disclaimer, the term of this patent is extended or adjusted under 35 U.S.C. 154(b) by 0 days.

(21) Appl. No.: 09/582,647

(22) PCT Filed: Mar. 2, 1999

(86) PCT No.: PCT/JP99/00987

§ 371 (c)(1),
(2), (4) Date: Jun. 29, 2000

(87) PCT Pub. No.: WO99/45627

PCT Pub. Date: Sep. 10, 1999

(30) Foreign Application Priority Data

Mar. 4, 1998 (JP) .............................. 10-069410
Jun. 5, 1998 (JP) .............................. 10-173913

(51) Int. Cl.⁷ ................................................. H01F 7/08
(52) U.S. Cl. .................. 335/220; 335/229; 310/154.35
(58) Field of Search ....................... 310/154.35–154.38, 310/166, 168; 335/220–229

(56) References Cited

U.S. PATENT DOCUMENTS

| | | | | |
|---|---|---|---|---|
| 3,434,082 A | * | 3/1969 | Montagu | .................... 335/220 |
| 3,891,922 A | * | 6/1975 | Atzinger | .................. 324/154 R |
| 4,266,291 A | | 5/1981 | Obata et al. | |
| 4,462,014 A | * | 7/1984 | Montagu | ..................... 335/230 |
| 4,523,167 A | * | 6/1985 | Remington | .................. 335/230 |
| 5,870,010 A | * | 2/1999 | Ackermann | .................. 335/229 |
| 6,147,427 A | * | 11/2000 | Ackermann et al. | ... 310/154.35 |

FOREIGN PATENT DOCUMENTS

| | | | |
|---|---|---|---|
| DE | 19739068 A1 | * | 9/1997 |
| JP | 54-89207 | | 7/1979 |
| JP | 7-15938 | | 1/1995 |
| JP | 8-228466 | | 9/1996 |
| JP | 9-88698 | | 3/1997 |

* cited by examiner

Primary Examiner—Lincoln Donovan
(74) Attorney, Agent, or Firm—Wenderoth, Lind & Ponack, L.L.P.

(57) ABSTRACT

In an electromagnetic actuator wherein a rotatable rotor and at least one magnetomotive force source are integrally incorporated through a magnetic path, magnets 5-1 and 5-2 magnetized with opposite polarities are provided on a part of the peripheral surface of the rotor 4. Three pole pieces 12, 13 and 14 are provided on the peripheral edge of an opening in which the rotor 4 is provided. Connecting paths 15, 16 and 18 are provided for each pair of adjacent pole pieces.

23 Claims, 8 Drawing Sheets

ACTUATOR

TECHNICAL FIELD

The present invention relates to an actuator capable of controlling a rotational position and a travel position according to the coil current and is applicable, for example, to the throttle control, ISC (Idle Speed Control) and variable intake control of an internal combustion engine.

BACKGROUND ART

The prior art will be described with regard to a throttle actuator for an automobile by way of example. The throttle actuator needs to move a moving member, e.g. a rotor, according to driving force (magnetomotive force) corresponding to the magnitude of an electric current. The present applicant has already proposed Japanese Patent Application Nos. 7-56686 and 8-140665.

An outline of the prior art will be described below by using FIGS. 1(1)–12(d). FIG. 12(a) is a front view (when the coil is not energized); FIG. 12(b) is a plan view; FIG. 12(c) is a side view showing the prior art by cutting the front view along the center line; and FIG. 12(d) is a front view (when the coil is energized). As shown in FIG. 12(a), reference numeral 1 denotes a yoke, and a coil 2 as a drive source is provided on the central upper portion of the yoke 1. A main air gap 3 is provided under the coil position in the center, and a rotating member 6 is rotatably fitted in the main air gap 3. The rotating member 6 has a magnet 5 secured to the peripheral edge of a rotor 4. It should be noted that the rotating member 6 rotates about a shaft (lying at the center position of the rotating member). Reference numeral 7 denotes a core.

Next, the operation will be described. In FIG. 12(a), when the coil 2 is not excited, magnetic flux from the north pole of the magnet 5 reaches the south pole via the yoke I, which lies on both sides of the magnet 5. Therefore, this state (state illustrated in the figure) is stable, and the illustrated state is maintained. When the coil is excited, the rotating member 6 is rotated by magnetic flux (FIG. 12(d)) from the coil 2 to move to the most stable rotational position and stops at this position. It should be noted that the above-mentioned Japanese Patent Application No.7-56686 is of the type in which counterforce is obtained by a magnetic spring. Although not shown, Japanese Patent Application No. 9-111857, for example, obtains counterforce by a magnetic spring as in the case of the above and uses an auxiliary mechanical spring only in the vicinity of a default opening position (a position where a correct throttle valve position is ensured even when the coil is brought into an unenergized state by a failure).

The prior art described above with reference to FIGS. 12(a)–12(d) requires a large amount of yoke material and also needs a large amount of magnet material because the magnet is provided on the entire circumference of the rotor 4. Consequently, the overall configuration becomes large in size. Although not described in detail, Japanese Patent Application No. 9-111857 uses a mechanical auxiliary spring in the vicinity of the default position and is therefore structurally complicated and costly.

The present invention was made to solve the above-described problems, and an object of the present invention is to provide a lightweight and low-cost actuator by reducing the weight through size reduction and also reducing the amount of magnet material used. Other objects of the present invention are to provide an actuator which has a stable and highly accurate default position, allows the default position to be set easily, which has a simplified structure, and requires a reduced amount of magnet material.

SUMMARY OF THE INVENTION

The present invention provides an electromagnetic actuator wherein a rotatable rotor and at least one magnetomotive force source are integrally incorporated through a magnetic path. In the actuator, an integral magnet magnetized with a north pole and a south pole, or separate magnets magnetized in opposite directions to have a north pole and a south pole, respectively, are provided on the peripheral edge of the rotor. In addition, three pole pieces are provided on the peripheral edge of an opening in which the rotor is provided, and each pair of adjacent pole pieces is connected by a connecting path. By virtue of the described arrangement, the connecting paths are less likely to be magnetically saturated, and thus the sectional area of the yoke can be reduced.

In addition, the present invention provides an electromagnetic actuator wherein a rotatable rotor and at least one magnetomotive force source are integrally incorporated through a magnetic path, and wherein an integral magnet magnetized with a north pole and a south pole, or separate magnets magnetized in opposite directions to have a north pole and a south pole, respectively, are provided on the peripheral edge of the rotor. In addition, three pole pieces are provided on the peripheral edge of an opening in which the rotor is provided, and each pair of adjacent pole pieces is connected by a connecting path. In the actuator, an outward projecting space is asymmetrically provided in the peripheral edge of the opening, and two of the pole pieces are provided at both extremities of the operating range of the rotor, wherein the lengths of portions of the two pole pieces that face the rotor are different from each other.

BEST MODE FOR CARRYING OUT THE INVENTION

Figure 1A:
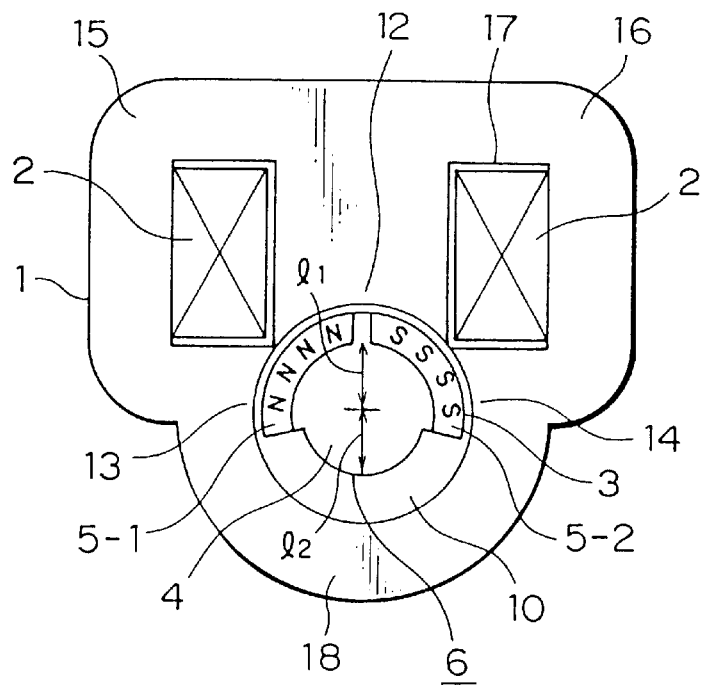
FIGS. 1(a)–1(c) are diagrams showing the arrangement of an embodiment of the actuator according to the present invention.
Figures 1B, 1C:
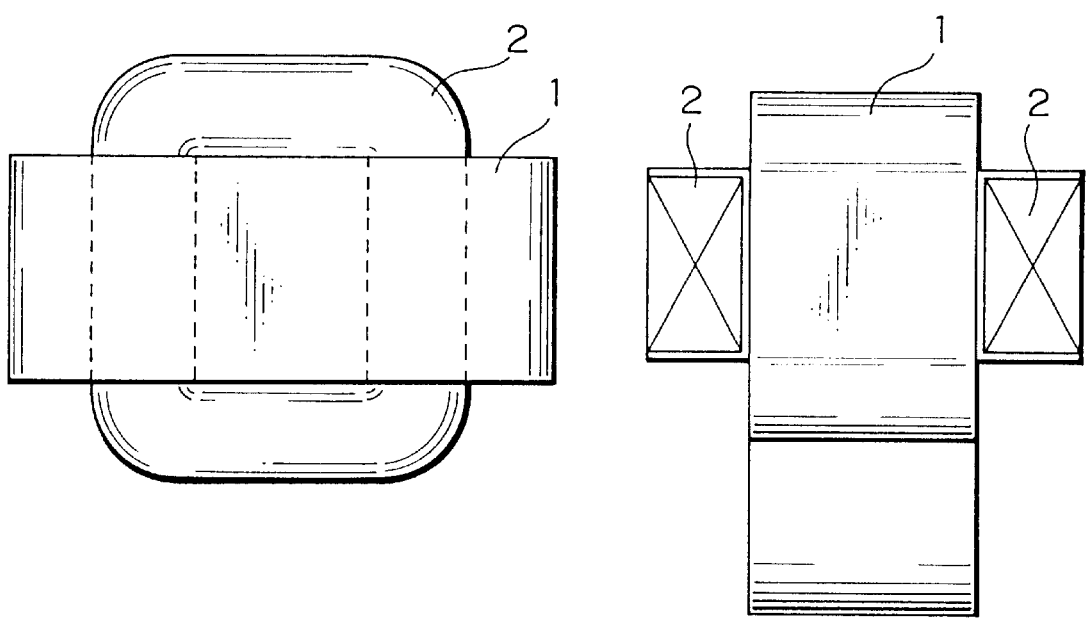

The present invention will be described more specifically with reference to the accompanying drawings. FIGS. 1(a)–1(d) are diagrams showing the arrangement of an embodiment of the actuator according to the present invention. FIG. 1(a) is a front view (when the coil is not energized); FIG. 1(b) is a plan view; and FIG. 1(c) is a side view. It should be noted that in the following drawings, are the same as those shown in FIGS. 1(b) and 1(c) and therefore deleted from each drawing. In FIGS. 1(a) and 1(c) the same portions as those in FIGS. 12(a)–12(d) are denoted by the same reference numerals, and a description thereof is omitted. The structural feature of this embodiment resides in that the overall configuration of a rotating member 6 is not a circular shape corresponding to the shape of a main air gap 3, which has a circular shape. That is, a rotor 4 has a shape defined by a first circumference with a radius $1_1$ with respect to the center O of the rotating member 6 and a second circumference with a radius $1_2$ with respect to the center O of the rotating member 6. Magnets 5-1 and 5-2 are secured to a portion of the rotor along the first circumference. Accordingly, there is a space (a portion where the rotating member 6 is not present) 10 in the circular main air gag. It should be noted that the magnet 5-1 has been magnetized with a north pole, and the magnet 5-2 has been magnetized with a south pole.

Accordingly, the magnet 5-1 faces pole pieces 12 and 13, and the portion of the magnet 5-1 that faces the pole pieces 12 and 13 is the north pole. The magnet 5-2 faces the pole piece 12 and another pole piece 14, and the portion of the magnet 5-2 that faces the pole pieces 12 and 14 is the south pole. In short, the pole piece 12 faces the two magnets, and the pole piece 13 faces the magnet 5-1. The pole piece 14 faces the magnet 5-2. Each pole piece and the corresponding magnet face each other across a mechanical gap of the order of 0.4 mm in general. A coil 2 (magnetomotive force source) is wound around connecting magnetic paths 15 and 16, which extend from the pole piece 12 to the pole pieces 13 and 14 through a bobbin 17. In addition, the pole pieces 13 and 14 are connected by a connecting magnetic path 18.

Figure 2:
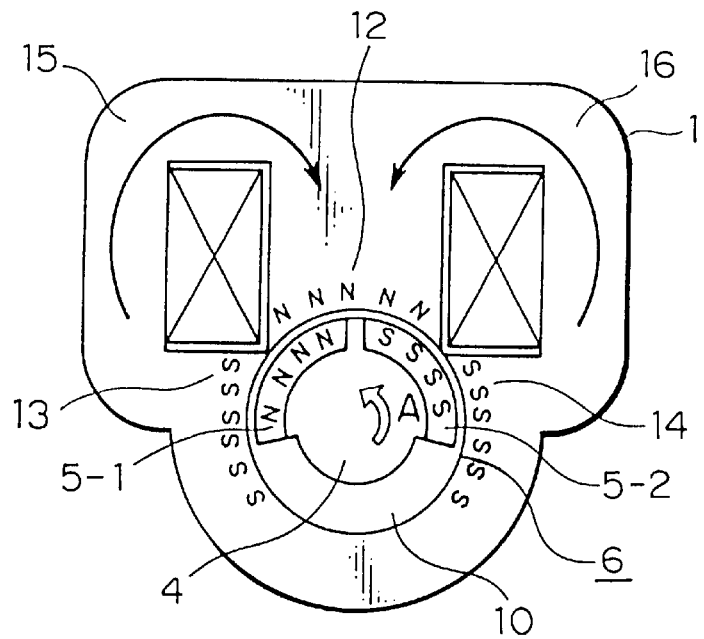
FIG. 2 is a diagram showing the operating principle of the actuator according to the present invention.

The operating principle will be described with reference to FIG. 2. When the coil 2 is energized, magnetic flux is produced as shown by the solid-line arrows, and magnetic poles as shown in the figure are created on the pole piece side. That is, a south pole is created in the pole piece 13, and attraction force acts between the south pole and the north pole of the magnet 5-1. Meanwhile, a south pole is created in the pole piece 14, and repulsion force acts between the south pole and the south pole of the magnet 5-2. On the other hand, a north pole is created in the pole piece 12. Consequently, repulsion force acts between the pole piece 12 and the magnet 5-1, whereas attraction force acts between the pole piece 12 and the magnet 5-2. These forces, as a whole, cause the rotating member 6 to rotate in the direction of the arrow A shown in the figure. If the energization direction is reversed in this state, the polarities of the pole pieces are inverted, and a torque is induced in the reverse direction.

Figure 3:
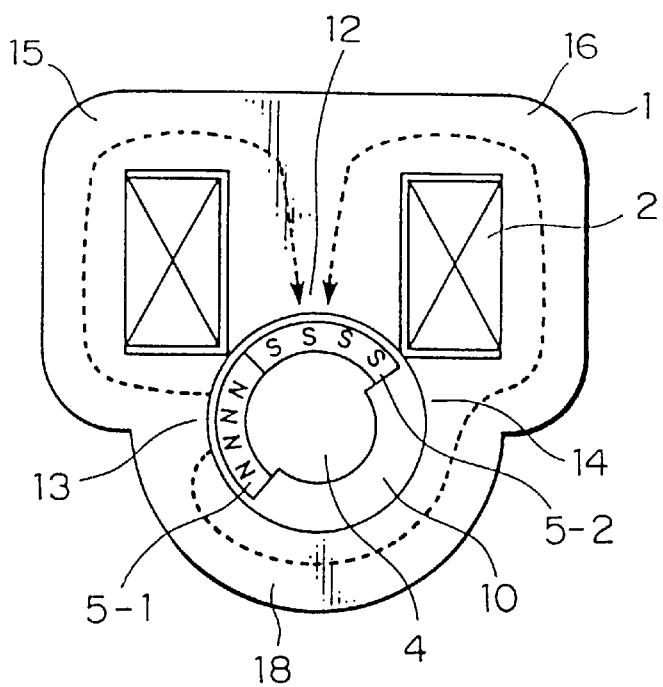
FIG. 3 is a diagram showing that magnetic saturation does not occur in the embodiment.

The fact that magnetic saturation is unlikely to occur in this embodiment will be described with reference to FIG. 3. In general, magnetic flux in an actuator comprising a magnet and a coil passes along a magnetic path coming out of the north pole of the magnet and interlinking with the coil current and then entering the south pole of the magnet. At this time, the amount of magnetic flux depends on the position of the rotor 4 and the coil current. In order to ensure a necessary torque when the amount of magnetic flux is the largest, it is necessary to ensure a sufficiently large sectional area of the magnetic path to avoid influence of magnetic saturation. FIG. 3 shows a case where the above-described largest magnetic flux is produced. In this case, one magnetic flux coming out of the magnet 5-1 forms a magnetic path in which the magnetic flux passes through the pole piece 13 and enters the magnet 5-2 via the connecting magnetic path 15 and the pole piece 12. Another magnetic flux from the magnet 5-1 forms a magnetic path in which the magnetic flux passes through the pole piece 13 and enters the magnet 5-2 via a connecting magnetic path 18, the pole piece 14, the connecting magnetic path 16 and the pole piece 12.

It should be noted that the magnet shown in FIG. 3 is one magnet magnetized with a north pole and a south pole, which is virtually the same as two magnets magnetized in opposite directions (a north pole and a south pole). Supposing that there is no connecting magnetic path 18, all the magnetic flux from the magnet 5-1 passes through the pole piece 13 and enters the magnet 5-2 via the connecting magnetic path 15. Accordingly, the actuator needs a magnetic path having a sectional area twice as large as the sectional area in a case where the connecting magnetic path 18 is provided. Moreover, the magnetic path length becomes long, which is disadvantageous in terms of weight. The same is the case with the connecting magnetic path 16 (when the rotor 4 is in a position on the opposite side). The effect of the present invention will be clear if comparisons are made with FIG. 12 (d). It should be noted that the magnet-side portions of the pole pieces 12 and 13 may be connected to each other, and so may the magnet-side portions of the pole pieces 12 and 14, if the configuration is such that magnetic saturation occurs during the operation of the actuator, as stated in Japanese Patent Application No. 8-140665. According to this embodiment, it is possible to achieve a lightweight and compact actuator, and the amount of magnet material used can be reduced.

Figure 4:
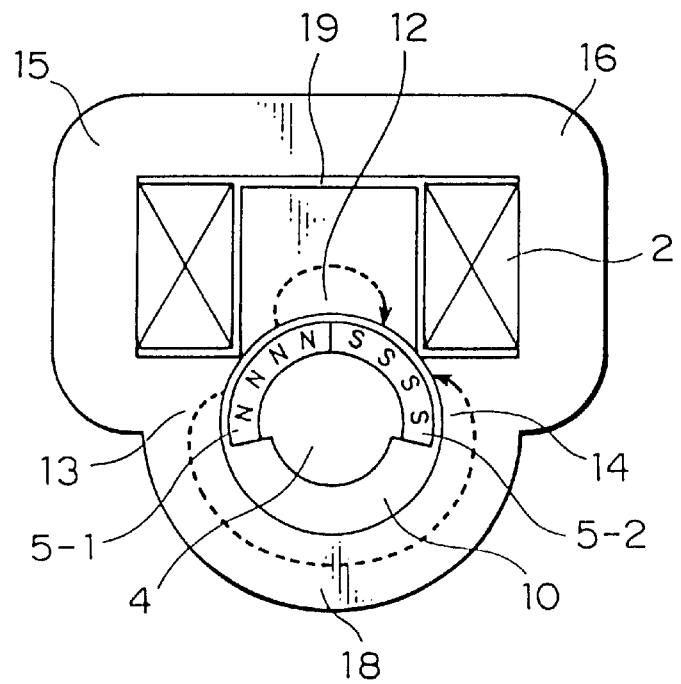
FIG. 4 is a diagram showing the arrangement of another embodiment.

FIG. 4 is a diagram showing the arrangement of another embodiment. In this embodiment, a magnetic gap 19 is provided at the joint between the pole piece 12 and the connecting magnetic paths 15 and 16. The magnetic gap 19 is filled with air or a non-magnetic material to form a magnetic reluctance. It should be noted that the reason for providing the magnetic gap 19 is to store magnetic energy in this portion to thereby add the same effect as that of a spring (Japanese Patent Application No. 7-56686). The operation of the embodiment shown in FIG. 4 will be described. When the coil 2 is unenergized, the rotor is stabilized in a state where no magnetic flux passes through the magnetic gap 19. That is, in the case of the rotor position shown in FIG. 4, the rotor is stabilized when magnetic flux from the magnet 5-1 to the magnet 5-2 passes through the pole piece 12 and also passes through the pole piece 13 to the pole piece 14 (the dotted lines in FIG. 4). This operating principle may be explained by the virtual work principle in electromagnetics. According to this embodiment, it is possible to achieve a lightweight and compact actuator, and the amount of magnet material used can be reduced. Moreover, a component for obtaining counterforce, such as a spring, becomes unnecessary.

Figure 5:
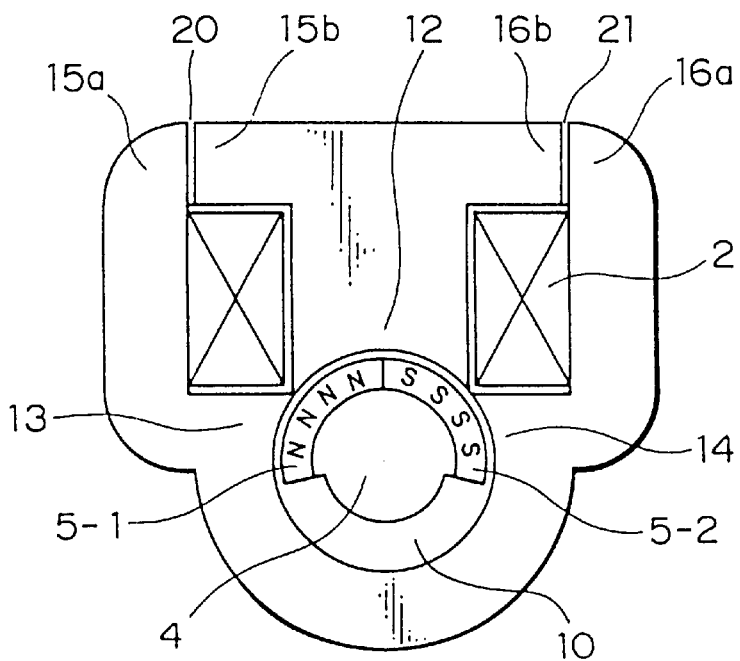
FIG. 5 is a diagram showing the arrangement of still another embodiment.

FIG. 5 is a diagram showing the arrangement of still another embodiment. In FIG. 5, the same portions as those in FIGS. 1(a)–1(c) are denoted by the same reference numerals, and a description thereof is omitted. In this embodiment, magnetic gaps are provided at two positions 20 and 21. That is, the magnetic gaps 20 and 21 are formed by a magnetic member including the pole piece 12 and connecting magnetic paths 15b and 16b and a magnetic member including the pole pieces 13 and 14 and connecting magnetic paths 15a and 16a. It should be noted that conditions for stabilization are the same as in the case of FIG. 4, and other operations are also the same as in the case of FIG. 4. According to this embodiment, it is possible to achieve a lightweight and compact actuator, and the amount of magnet material used can be reduced. Moreover, a component for obtaining counterforce, such as a spring, becomes unnecessary.

Figure 6:
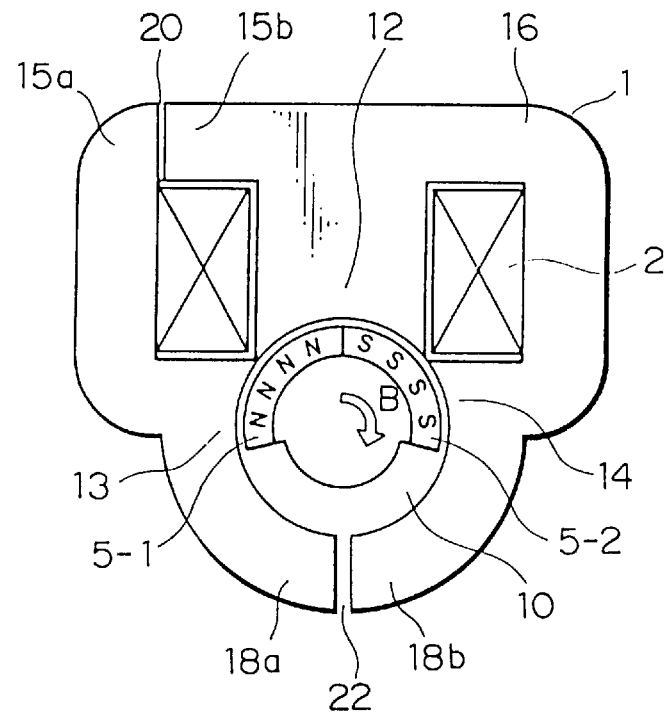
FIG. 6 is a diagram showing the arrangement of a further embodiment.

FIG. 6 is a diagram showing the arrangement of a further embodiment. In FIG. 6, the same portions as those in FIGS. 1(a)–1(c) are denoted by the same reference numerals, and a description thereof is omitted. In this embodiment, magnetic gaps are provided at two positions 20 and 22. That is, a first gap 20 is provided at a position where the connecting magnetic path 15 is divided into 15a and 15b, and a second gap 22 is provided at a position where the connecting magnetic path 18 is divided into 18a and 18b. In this case, when the coil 2 is unenergized, no magnetic flux passes through either of the magnetic gaps 20 and 22, and the rotor 4 reaches a stable state by rotating in the direction of the solid-line arrow B. That is, magnetic flux from the magnet 5-1 enters the magnet 5-2 via the connecting magnetic path 16, and this state is a stable state. In the case of the above-described FIGS. 4 and 5, a stable state is established at the center of the range of rotation of the rotor. In contrast, in this embodiment, a stable position when the coil is unenergized can be realized at the upper or lower limit position in the rotation range. According to this embodiment, a normally-closed position or a normally-open position can be realized when the actuator is used for driving a valve.

Figure 7:
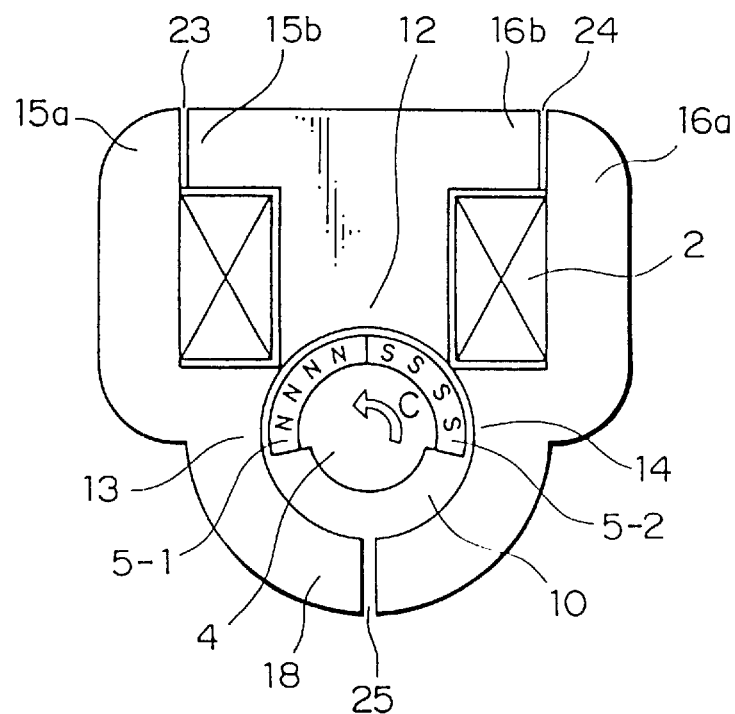
FIG. 7 is a diagram showing the arrangement of a still further embodiment.

FIG. 7 is a diagram showing the arrangement of a still further embodiment. In this embodiment, the connecting magnetic paths 15, 16 and 18 are provided with magnetic gaps 23, 24 and 25, respectively, and the magnetic reluctance of one of the magnetic gaps 23, 24 and 25 is set lower than the magnetic reluctance of another of them. In this embodiment, the magnetic reluctance of the magnetic gap 23 is set lower than the magnetic reluctance of the magnetic gap 24. In this case, a stable state when the coil is not energized can be realized when the amount of magnetic flux passing through the magnetic gap 23 is large (when the magnetic energy reaches a minimum in the entire system). In this embodiment, the rotor 4 is stabilized by rotating in the direction of the solid-line arrow C from the rotor position illustrated in the figure. According to this embodiment, a stable position when the coil is unenergized can be realized as desired according to the magnetic reluctance ratio between the magnetic gaps 23 and 24.

In the case of an electronically controlled throttle for an automobile, for example, the movable range is 90 degrees, and when the coil is unenergized, the throttle needs to be closed through about 15 degrees from the center position in the movable range. The reason for this is to prevent the automobile from stalling or running away even when the coil is unenergized. In this case, there are two different ways of use: one in which the movable range is set to ±60 degrees in the embodiment shown in FIG. 3 or 4, and each magnetic reluctance is set so that the rotor is moved through 60 degrees in the opening direction and through 30 degrees in the closing direction; and another in which the movable range is set to ±45 degrees in the embodiment shown in FIG. 7, and each magnetic reluctance is set so that the rotor reaches a stable position by rotating through 15 degrees in the closing direction from the center position.

As will be clear if we glance at each of the embodiments and the prior art shown in FIG. 12, it is possible to achieve a 25% reduction in weight and a 20% reduction in the amount of magnet material used. That is, according to the present invention, the number of pole pieces is increased to 3, and each pair of adjacent pole pieces are connected by a connecting path. Therefore, the connecting paths become less likely to be magnetically saturated. Accordingly, it is possible to reduce the sectional area of the yoke and hence possible to achieve a compact yoke. This allows a reduction in weight. In addition, a portion that needs no magnet is provided on the peripheral edge of the rotor by properly selecting the positional relationship between the three pole pieces. These are the reasons of the reduction in the amount of magnet material used.

As has been stated above, according to the present invention, the number of pole pieces is increased to 3, and each pair of adjacent pole pieces are connected by a connecting path. Therefore, it becomes possible to reduce the size of the yoke and hence possible to achieve a reduction in weight. In addition, it becomes possible to reduce the amount of magnet provided on the peripheral edge of the rotor.

Figure 8A:
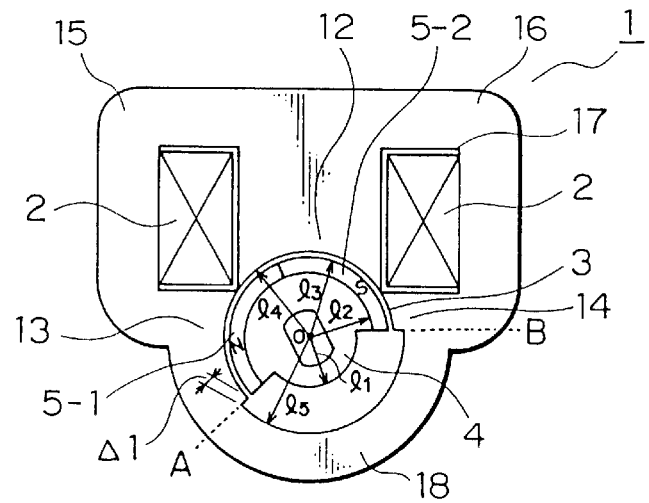
FIGS. 8(a)–8(c) are diagrams showing the arrangement of a still further embodiment.
Figure 8B:
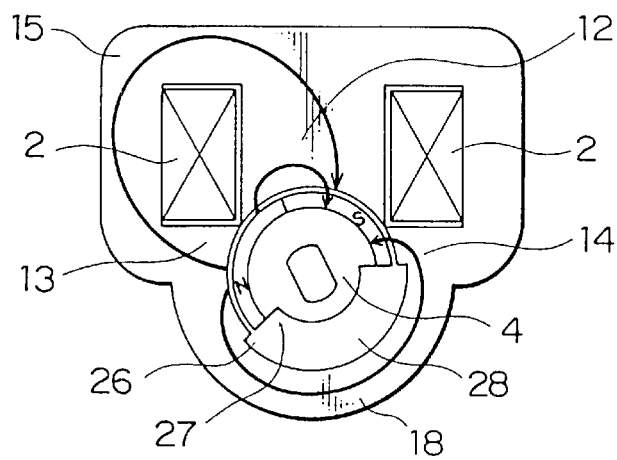
Figure 8C:
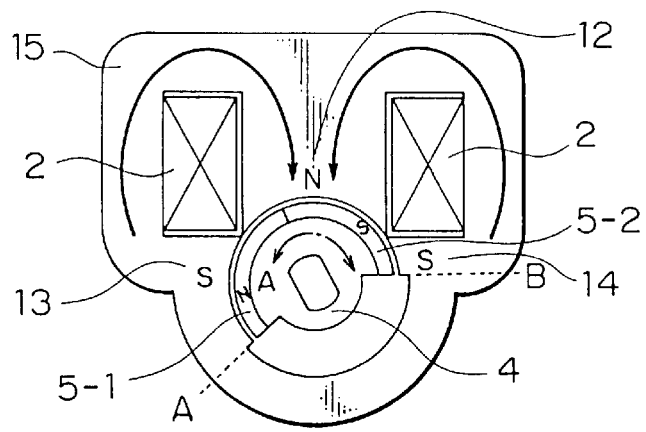

FIGS. 8(a)–8(c) are diagrams showing the arrangement of a still further embodiment. The structural feature of this embodiment resides in that a part of the main air gap 3 is enlarged to a considerable extent, and the enlarged part is provided with a deviation. In this embodiment, the main air gap 3 has a radius $1_4$ from the position A to the position B clockwise and a radius $1_5$ from the position B to the position A. The relationship between the radii $1_4$ and $1_5$ is $1_5 > 1_4$. That is, the actuator has a main air gap (opening) configuration in which the radius is increased by $1_5 - 1_4 = \Delta 1$ from the position B to the position A clockwise (this will hereinafter be referred to as "outward projecting space", and an opening portion enlarged by the outward projecting space will be referred to as "enlarged gap").

The rotor 4 has a radius $1_2$ from the position A to the position B clockwise and a radius $1_1$ from the position B to the position A. The relationship between the radii $1_2$ and $1_1$ is $1_2 > 1_1$ (the portion of the rotor 4 that has the radius $1_1$ will be referred to as "inward recess"). Reference numeral 5-1 denotes a magnet magnetized with a north pole, and reference numeral 5-2 denotes a magnet magnetized with a south pole. The magnets 5-1 and 5-2 are secured to the peripheral surface of the rotor 4. The radii shown in the figure have the following relationship: $1_5 > 1_4 > 1_3 > 1_2 > 1_1$. The enlarged gap is not in lateral symmetry but in asymmetry (deviated) with respect to a center line (not shown) passing through the point 0. For example, as shown in FIG. 8(a) the enlarged gap is arranged to be larger on the right-hand side than on the left-hand side. This means that a portion of the pole piece 13 that faces the magnet 5-1 (north pole) is large in length, whereas a portion of the pole piece 14 that faces the magnet 5-2 (south pole) is small in length. Reference numeral 2 denotes an electromagnetic coil as a magnetomotive force source, which is wound through a bobbin 17. Reference numerals 12, 13 and 14 denote pole pieces. As has already been stated above, a part of the magnet 5-1 and a part of the magnet 5-2 face the pole piece 12, and a part of the magnet 5-1 face the pole piece 13. A part of the magnet 5-2 faces the pole piece 14. Reference numerals 15, 16 and 18 denote connecting magnetic paths, as has already been stated above.

The operation will be described with reference to FIG. 8(b). First, when the electric current flowing through the electromagnetic coil 2 is zero, in the pole piece 12, magnetic flux from the north pole of the magnet reaches the south pole. In the pole piece 13, magnetic flux from the north pole of the magnet reaches the south pole of the magnet facing the pole piece 14 via the connecting magnetic path 18. In addition, magnetic flux from the north pole of the pole piece 13 reaches the south pole of the pole piece 12 via the connecting magnetic path 15. This is a stable state because the main air gap width is the smallest on each magnet side, i.e. $1_4$–$1_3$. Consequently, the rotor stops at the illustrated position. In this case, the position A of the outward projecting space 26 in the main air gap and the position A of the inward recess 27 coincide with each other, and so do the positions B (see the points A and B in FIG. 8(a)). Accordingly, the opening area 28 reaches a maximum. Regarding the pole pieces, the two pole pieces 13 and 14, which are provided on both sides of the operating range of the rotor 4, differ from each other in terms of the length of the respective portions facing the rotor, as has been stated above. That is, the portion of the pole piece 13 that faces the rotor is longer than that of the pole piece 14.

When the electromagnetic coil 2 is energized, magnetic flux is produced as shown by the arrows in FIG. 8(c), and a magnetic pole is created in each pole piece as illustrated in the figure. More specifically, a south pole is created in the pole piece 13, and attraction force acts between the south pole and the north pole of the magnet 5-1. On the other hand, a south pole is created in the pole piece 14, and repulsion force acts between the south pole and the south pole of the magnet 5-2. In addition, a north pole is created in the pole piece 12, and attraction force acts between the north pole and the south pole of the magnet 5-2. These forces, as a whole, cause the rotor 4 to rotate in the direction of the arrow A shown in the figure. If the energization direction is reversed in this state, the polarities of the pole pieces are inverted, and a torque is induced in the reverse direction. Next, let us consider a case where the value of an electric current having a predetermined value and flowing through the electromagnetic coil 2 has been made zero by a failure. In this case, the magnetomotive force source that is provided by the electromagnetic coil 2 disappears. Consequently, only the magnetomotive force source provided by the magnet of the rotor 4 is available.

Accordingly, the rotor 4 that has been at a predetermined angle corresponding to the current value returns in the direction of the arrow. However, when the end of the rotor magnet 5-2 coincides with the position B, the rotor 4 stops at this position. The reason for this is as follows. As has already been stated above, if the magnet 5-2 of the rotor 4 further continues rotating clockwise beyond the position B, the width of the air gap between the magnet 5-2 provided on the rotor and the outward projecting space in the main air gap becomes large, and hence the magnetic reluctance (reluctance) becomes high. According to this embodiment, the reluctance can be varied by adjusting the width and overall length of the outward projecting space. Thus, the rotor default position can be determined with high accuracy.

Figure 9:
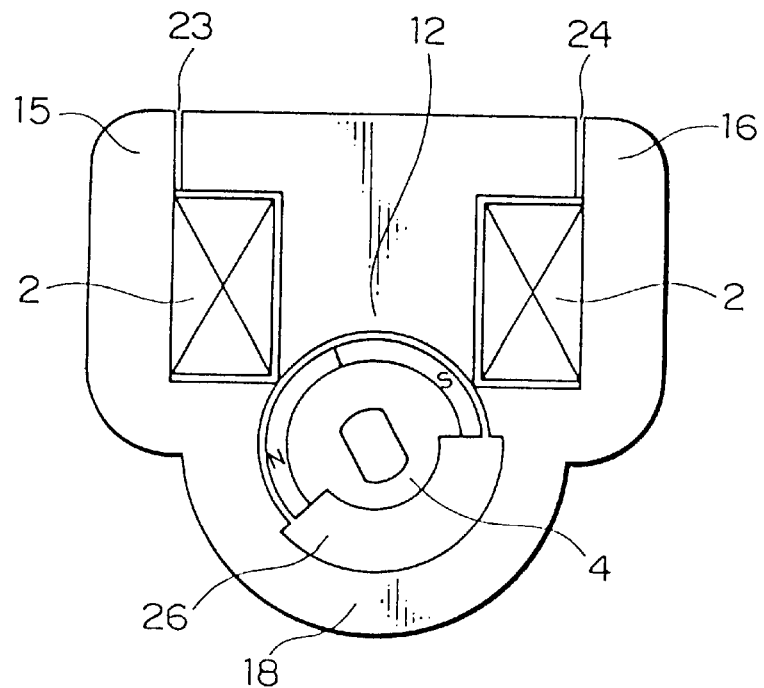
FIG. 9 is a diagram showing the arrangement of a still further embodiment.

FIG. 9 is a diagram showing the arrangement of a further embodiment. In FIG. 9, the same functional portions as those in FIGS. 8(a)–8(c) are denoted by the same reference numerals, and a description thereof is omitted. The structural feature of the embodiment shown in FIG. 9, by which the embodiment is distinguished from the embodiment shown in FIGS. 8(a)–8(c) resides in that magnetic gaps 23 and 24 are provided in the connecting magnetic paths 15 and 16. The rest of the embodiment is the same as in the case of FIGS. 8(a)–8(c). Next, the operation will be described. When an electric current is flowing through the electromagnetic coil 2, magnetic energy produced by magnetic flux from the electromagnetic coil is stored in the two magnetic gaps 23 and 24 and in the enlarged gap, as has already been stated. Accordingly, when the current flowing through the electromagnetic coil 2 becomes zero, a magnetic spring acts so as to minimize the stored magnetic energy. Consequently, the rotor 4 returns to the position shown in FIG. 9 and stops at this position. It should be noted that the stop position is as stated above. According to this embodiment, when the electromagnetic coil is de-energized, the rotor is returned to a predetermined position by the magnetic spring, and at this time, the rotor stops before the enlarged gap position. Therefore, the accuracy of the default position is improved. Moreover, because the magnets are provided only on a part of the rotor peripheral surface, the amount of magnet material used is reduced, and thus the cost is reduced.

Figure 10:
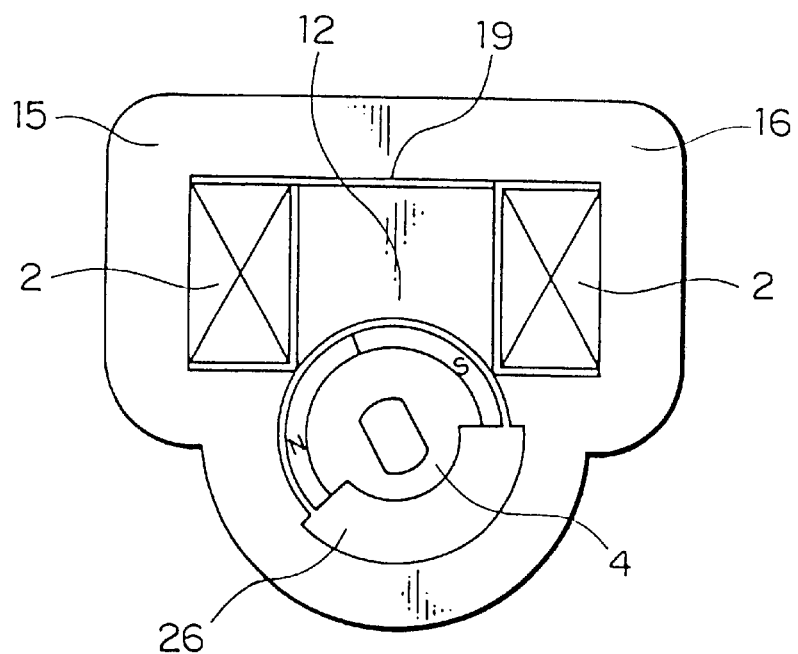
FIG. 10 is a diagram showing the arrangement of a still further embodiment.

FIG. 10 is a diagram showing the arrangement of a still further embodiment. In FIG. 10, the same functional portions as those in FIGS. 8(a)–8(c) are denoted by the same reference numerals, and a description thereof is omitted. The structural feature of the embodiment shown in FIG. 10, by which this embodiment is distinguished from the embodiment shown in FIGS. 8(a)–8(c), resides in that a magnetic gap 19 is provided at the joint between the pole piece 12 and the connecting magnetic paths 15 and 16. It should be noted that the reason for providing the magnetic gap 19 is to store magnetic energy in this portion to thereby add the same effect as that of a mechanical spring, as in the case of the above. According to this embodiment, advantageous effects similar to those in the case of FIG. 9 are obtained.

Figure 11:
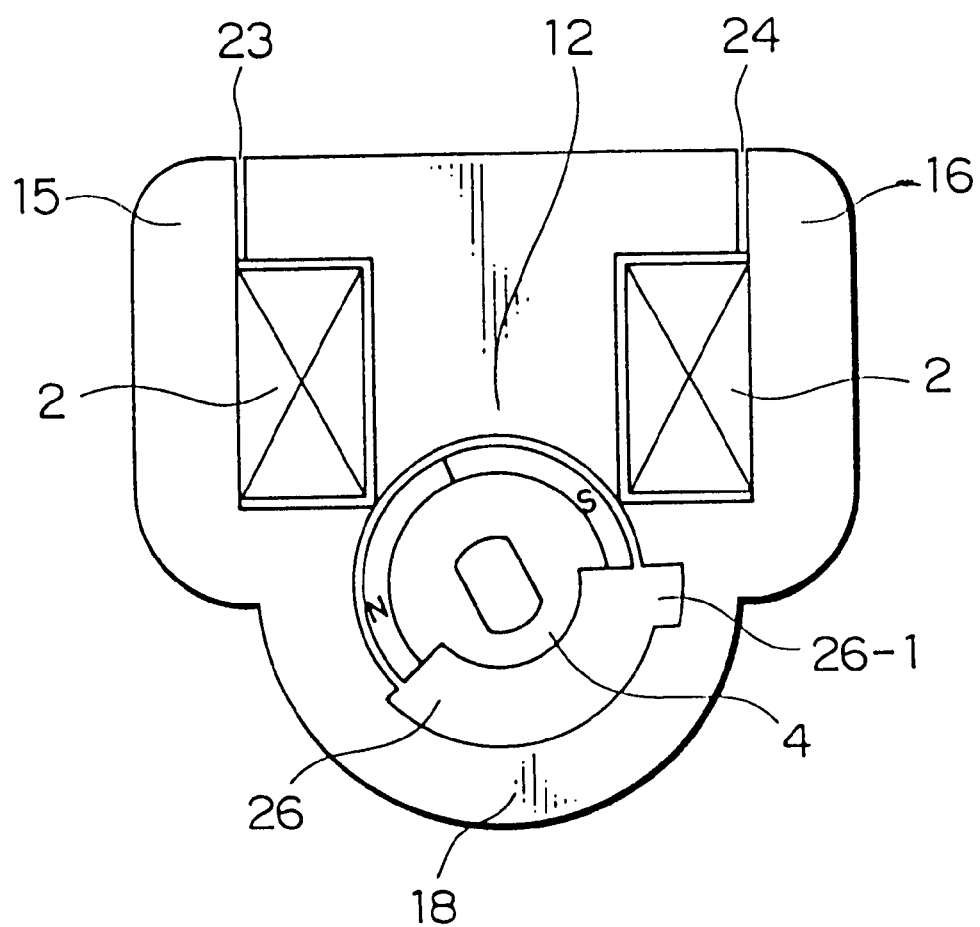
FIG. 11 is a diagram showing the arrangement of a still further embodiment.
Figure 12A:
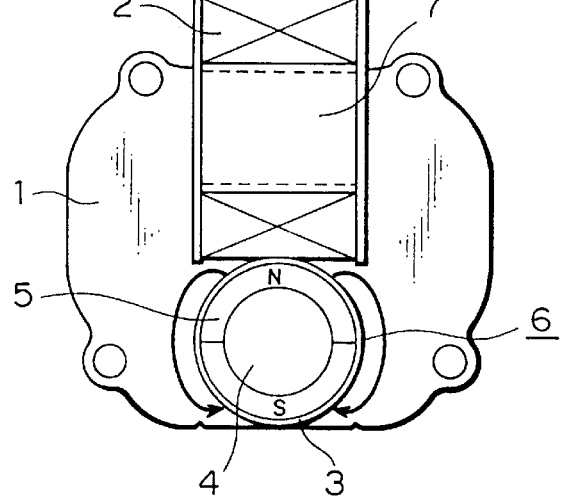
FIGS. 12(a)–12(d) are diagrams showing an outline of the prior art.
Figure 12C:
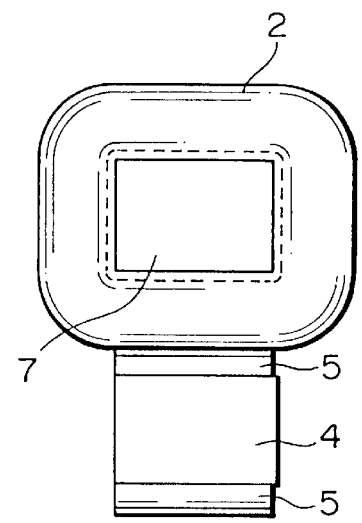
Figure 12B:
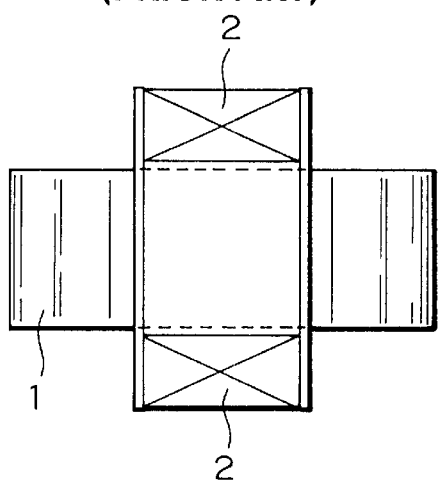
Figure 12D:
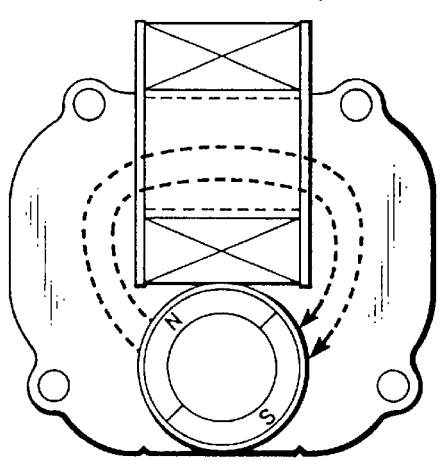

FIG. 11 is a diagram showing the arrangement of a still further embodiment. In FIG. 11, the same functional portions as those in FIG. 9 are denoted by the same reference numerals, and a description thereof is omitted. The structural feature of the embodiment shown in FIG. 11, by which this embodiment is distinguished from the embodiment shown in FIG. 9, resides in that the outward projecting space in the main air gap is formed in a stepped shape. That is, as shown in FIG. 11, a projecting space 26-1 that is larger than the outward projecting space 26 is provided at the right end of the outward projecting space 26 to form a stepped structure. According to this embodiment, the rotor default position can be determined with high accuracy by adjusting the width and length of each step of the outward projecting space.

According to the present invention, it is possible to provide a low-cost actuator in which three pole pieces are provided, and each pair of adjacent pole pieces are connected by a connecting path, and in which a stable and highly accurate default position can be set easily by adjusting the width and length of the outward projecting space in the main air gap.

Industrial Applicability

The present invention is capable of controlling a rotational position or a travel position according to the electric current flowing through an electromagnetic coil and of returning to the initial position without a mechanical spring and hence applicable, for example, to the throttle control, idle speed control (ISC) and variable intake control of an internal combustion engine.

What is claimed is:

1. An electromagnetic actuator comprising:
   a rotatable rotor comprising a magnet having at least one magnet member magnetized so as to have a north pole and a south pole and disposed on part of a peripheral portion of said rotor, said north pole and said south pole being circumferentially spaced on said rotatable rotor, and said magnet being rotatable with said rotatable rotor;

at least one magnetomotive force source assembled with said rotatable rotor; and at least one magnetic path forming member assembled with said rotatable rotor and said at least one magnetomotive force source so as to form three pole pieces on a peripheral edge of an opening receiving said rotatable rotor, including a center pole piece and two end pole pieces, such that when said at least one magnetomotive force source is not energized, two magnetized surfaces of said magnet corresponding to said north pole and said south pole face said center pole piece;

wherein said two end pole pieces are each in contact with said center pole piece or are adjacent to said center pole piece with a gap therebetween;

wherein said three pole pieces include at least one adjacent pair of pole pieces that are connected by a magnetic path of said at least one magnetic path forming member; and wherein one of said end pole pieces has an outwardly projecting space that is provided asymmetrically in said opening such that lengths of portions of said two end pole pieces that face said rotor are different from each other.

2. An electromagnetic actuator comprising:

a rotatable rotor comprising a magnet having at least one magnet member magnetized so as to have a north pole and a south pole and disposed on part of a peripheral portion of said rotor, said north pole and said south pole being circumferentially spaced on a periphery of said rotatable rotor, and said magnet being rotatable with said rotatable rotor;

at least one magnetomotive force source assembled with said rotatable rotor; and at least one magnetic path forming member assembled with said rotatable rotor and said at least one magnetomotive force source so as to form three pole pieces arranged side by side to partly surround said rotatable rotor and adjacent to said at least one magnetomotive force source and so as to form magnetic connecting paths for connecting each adjacent pair of said three pole pieces such that when said at least one magnetomotive force source is not energized, two magnetized surfaces of said magnet corresponding to said north pole and said south pole face one of said three pole pieces.

3. The actuator of claim 2, wherein said magnet member is formed separately from said rotatable rotor and attached thereto.

4. The actuator of claim 2, wherein said north and south poles are spaced from each other by a space along the periphery of said rotor such that when said magnetomotive force is not energized, said space between said north and south poles faces one of said magnetic connecting paths for connecting an adjacent pair of said three pole pieces and each of said two magnetized surfaces partly faces a respective pole piece of said three pole pieces situated at respective ends of said one of said magnetic connecting paths.

5. The actuator of claim 4, wherein said at least one magnetic path forming member comprises a yoke incorporating said at least one magnetomotive force source, said yoke including one center and two side pole pieces forming said three pole pieces, said magnetic paths and an opening for rotatably receiving said rotatable rotor therein.

6. The actuator of claim 5, wherein said one of said magnetic connecting paths is located at a side opposite to said center pole piece so as to connect said two side pole pieces.

7. The actuator of claim 2, wherein said magnet member forms an arc extending along part of the periphery of said rotor.

8. The actuator of claim 2, wherein said magnetomotive force source is adjacent to at least one of said three pole pieces.

9. The actuator of claim 2, and further comprising a magnetic gap in one of said magnetic connecting paths.

10. The actuator of claim 2, and further comprising magnetic gaps at two positions in said magnetic connecting paths.

11. The actuator of claim 2, and further comprising magnetic gaps in said magnetic connecting paths provided such that at least one of said magnetic gaps has a magnetic reluctance that is different from another of said magnetic gaps.

12. The actuator of claim 2, and further comprising an opening rotatably receiving said rotor therein, said opening being formed adjacent to said three pole pieces, and an outwardly projecting space that is provided asymmetrically in said opening and communicating with said opening such that lengths of portions of two end pole pieces of said three pole pieces that face said rotor are different from each other.

13. The actuator of claim 12, wherein said opening includes a main air gap, said outwardly projecting space forms part of said main air gap, and said rotor has a default position at least partly determined by the length and width of said outwardly projecting space of said main air gap.

14. An electromagnetic actuator comprising:

a rotatable rotor comprising at least one permanent magnet that is fixed and rotatable therewith and magnetized so as to have a north pole and a south pole circumferentially spaced on said rotatable rotor;

at least one magnetomotive force source assembled with said rotatable rotor; and a yoke assembled with said rotatable rotor and said at least one magnetomotive force source forming three pole pieces partly circumferentially surrounding said rotatable rotor and positioned adjacent to said at least one magnetomotive force source, said yoke forming magnetic connecting paths for connecting adjacent pairs of said three pole pieces such that when said at least one magnetomotive force'source is not energized, two magnetized surfaces of said magnet corresponding to said north pole and said south pole face one of said three pole pieces.

15. The actuator of claim 14, wherein said yoke forms an opening receiving said rotor for rotation therein, and wherein said rotor has a larger diameter portion comprising said at least one permanent magnet and a smaller diameter portion such that an air gap is formed between said rotor and said opening along said smaller diameter portion.

16. The actuator of claim 15, wherein said north pole and said south pole each extend less than halfway around the circumference of said rotor.

17. The actuator of claim 16, wherein said opening has a smaller diameter portion corresponding to the circumferential extent of said larger diameter portion of said rotor and said opening has a larger diameter portion corresponding to the circumferential extent of said smaller diameter portion of said rotor such that said air gap is enlarged so as to define a default position of said rotor in which said smaller diameter portion of said opening corresponds with said larger diameter portion of said rotor and to which default position said rotor returns when said magnetomotive force source is not energized.

18. The actuator of claim 17, and wherein said air gap is provided asymmetrically in said opening such that lengths of portions of two end pole pieces of said three pole pieces that face said rotor are different from each other.

19. The actuator of claim 14, wherein said yoke has said opening positioned on one side of said magnetomotive force source such that said magnetomotive force source separates portions of said yoke at different circumferential positions around said opening into said three pole pieces.

20. The actuator of claim 19, wherein said yoke at least partially surrounds said opening.

21. The actuator of claim 20, wherein said yoke comprises at least one magnetic gap in said magnetic connecting paths.

22. The actuator of claim 21, wherein said at least one magnetic gap comprises a plurality of magnetic gaps in said magnetic connecting paths.

23. The actuator of claim 22, wherein said plurality of magnetic gaps vary in magnetic reluctance.

* * * * *